US008711896B2

(12) United States Patent
Dribinski et al.

(10) Patent No.: US 8,711,896 B2
(45) Date of Patent: Apr. 29, 2014

(54) ALLEVIATION OF LASER-INDUCED DAMAGE IN OPTICAL MATERIALS BY SUPPRESSION OF TRANSIENT COLOR CENTERS FORMATION AND CONTROL OF PHONON POPULATION

(75) Inventors: Vladimir Dribinski, San Jose, CA (US); Yung-Ho Alex Chuang, Cupertino, CA (US)

(73) Assignee: KLA-Tencor Corporation, Milpitas, CA (US)

(*) Notice: Subject to any disclaimer, the term of this patent is extended or adjusted under 35 U.S.C. 154(b) by 282 days.

(21) Appl. No.: 12/772,953

(22) Filed: May 3, 2010

(65) Prior Publication Data

US 2011/0164648 A1    Jul. 7, 2011

Related U.S. Application Data

(60) Provisional application No. 61/292,375, filed on Jan. 5, 2010.

(51) Int. Cl.
*H01S 3/091* (2006.01)

(52) U.S. Cl.
USPC ................................ 372/70; 372/34; 372/41

(58) Field of Classification Search
USPC .......................................................... 372/70
See application file for complete search history.

(56) References Cited

U.S. PATENT DOCUMENTS

| | | | |
|---|---|---|---|
| 3,805,188 A | | 4/1974 | Wuerker et al. |
| 5,861,981 A | * | 1/1999 | Jabr .......................... 359/337.1 |
| 6,347,100 B1 | * | 2/2002 | Sanders et al. .................... 372/6 |
| 6,452,717 B1 | * | 9/2002 | Endo ............................. 359/337 |
| 6,456,426 B1 | * | 9/2002 | Bolshtyansky et al. ....... 359/334 |
| 2004/0095968 A1 | * | 5/2004 | Avizonis et al. .................. 372/6 |

FOREIGN PATENT DOCUMENTS

| | | |
|---|---|---|
| JP | 2002-139436 A | 5/2002 |
| WO | WO2010/047180 A1 | 4/2010 |

OTHER PUBLICATIONS

Henschel et al. "Radiation hardening of optical fibre links by photobleaching with light of shorter wavelength," IEEE Transactions on Nuclear Science, vol. 43, No. 3, Jun. 1996, pp. 1050-1056.
Sigel, Jr. et al. "An Analysis of Photobleaching Techniques for the Radiation Hardening of Fiber Optic Data Links," IEEE Transactions on Nuclear Science, vol. NS-28, No. 6, Dec. 1981, pp. 4095-4101.

* cited by examiner

*Primary Examiner* — Xinning Niu
(74) *Attorney, Agent, or Firm* — Bever, Hoffman & Harms, LLP; Jeanette S. Harms

(57) ABSTRACT

Laser-induced damage in an optical material can be mitigated by creating conditions at which light absorption is minimized. Specifically, electrons populating defect energy levels of a band gap in an optical material can be promoted to the conduction band—a process commonly referred to as bleaching. Such bleaching can be accomplished using a predetermined wavelength that ensures minimum energy deposition into the material, ideally promoting electron to just inside the conduction band. In some cases phonon (i.e. thermal) excitation can also be used to achieve higher depopulation rates. In one embodiment, a bleaching light beam having a wavelength longer than that of the laser beam can be combined with the laser beam to depopulate the defect energy levels in the band gap. The bleaching light beam can be propagated in the same direction or intersect the laser beam.

10 Claims, 9 Drawing Sheets

ALLEVIATION OF LASER-INDUCED DAMAGE IN OPTICAL MATERIALS BY SUPPRESSION OF TRANSIENT COLOR CENTERS FORMATION AND CONTROL OF PHONON POPULATION

RELATED APPLICATIONS

This application claims priority of U.S. Provisional Patent Application 61/292,375, entitled "Alleviation Of Laser-Induced Damage In Optical Materials By Suppression Of Transient Color Centers Formation And Control Of Phonon Population" filed Jan. 5, 2010.

BACKGROUND OF THE INVENTION

1. Field of the Invention

The present invention relates to laser systems and in particular to minimizing damage to optical materials, such as crystals, that are used in laser systems.

2. Related Art

Optical materials are key elements of modern-day laser systems. Common applications for optical materials include fabrication of basic optical components (e.g. windows, mirrors, polarizers, etc.) as well as nonlinear optical devices for frequency mixing (e.g. harmonic generation, parametric generation/amplification), Raman amplification, Kerr-lens modelocking, electro-optic modulation, and acousto-optic modulation.

When exposed to laser radiation, physical properties of these optical materials may change with time as a result of interaction between light and matter. Such changes may adversely affect optical properties including, but not limited to, transmittance, reflectivity, and refraction indices. These adverse changes are generally referred to as material damage. The material lifetime, i.e. the amount of time in which the material is serviceable for its intended purpose within a range of accuracy, is typically defined based on a maximum acceptable change in one or more of these parameters.

Laser-induced damage of optical materials is one of the main factors affecting material lifetime, thereby limiting performance of laser systems. Laser-induced damage has been subject to extensive research, which has focused on (i) improving the quality of the existing optical materials and development of new compounds that possess high laser damage tolerance and/or (ii) optimization of operating conditions to mitigate laser-induced damage. This optimization of operating conditions has become increasingly important as the growing demand for high power DUV (deep ultraviolet light having a wavelength $\lambda<300$ nm) lasers imposes such extreme material requirements that conventional damage tolerance improvement approaches quickly become insufficient, too costly, and/or impractical.

The most common technique used to mitigate laser-induced damage is thermal annealing. It is widely employed as a method of reducing laser-induced damage because it works for many different types of damage in various materials and is relatively easy to implement. Unfortunately, efficient thermal annealing can require a high temperature, which when used during real-time laser system operation can pose significant disadvantages.

First, presence of a high temperature inside a laser system is highly undesirable because thermal gradients can cause air fluctuations that result in output beam instability and increased outgassing intensifies photocontamination. Second, at short (e.g. DUV) wavelengths, when photon energies approach band gaps of common optical materials, phonon-assisted absorption becomes significant and increases exponentially with temperature. This absorption can lead to decline in overall system performance, for example, one can observe decreased conversion efficiency when applied to nonlinear frequency conversion. Moreover, this phonon-assisted absorption may exacerbate other laser-induced damage to the optical material, thereby potentially negating the positive effects of annealing.

Note that in certain situations, the temperature of the optical material needs to be precisely controlled for reasons unrelated to material lifetime. For example, in non-critical phase matching (for certain wavelengths combinations only), the phase mismatch can be minimized by adjusting the crystal temperature such that the phase velocities of the interacting beams are equal. Therefore, for such situations, the application of thermal annealing is limited, if at all possible.

Therefore, a need arises for a technique of minimizing laser-induced damage in optical materials that overcomes the drawbacks of conventional annealing.

SUMMARY OF THE INVENTION

Damage can occur when light energy is deposited into an optical material via light absorption. As described in further detail herein with respect to the present invention, laser-induced damage in an optical material can be mitigated by creating conditions at which light absorption is minimized. Specifically, electrons populating defect energy levels of a band gap in an optical material can be promoted to the conduction band—a process commonly referred to as bleaching. Such bleaching can be accomplished using a predetermined wavelength that ensures minimum energy deposition into the material, ideally promoting electrons to just inside the conduction band. In some cases phonon (i.e. thermal) excitation can also be used to achieve higher depopulation rates.

In one embodiment, a bleaching light beam having a wavelength longer than that of the laser beam can be combined with the laser beam to depopulate the defect energy levels in the band gap. The bleaching light beam can be propagated in the same direction or intersect the laser beam. In one embodiment to optimize depopulation, both the bleaching light beam and the laser beam can be pulsed with a delay between the pulses of the two sources, i.e. the bleaching light beam and the laser beam. In another embodiment, one wavelength of a laser beam having multiple wavelengths can be delayed and propagated with the laser beam, thereby also depopulating the defect energy level.

In one embodiment using a pulsed laser, the temperature of the optical material can be modulated such that it is low during the laser pulse and high between the pulses and/or when no laser pulses propagate through the optical material. The advantage of temperature modulation is more efficient thermal annealing of defects when no laser pulses are present without increase in light absorption due to high temperature. In another embodiment, a temperature gradient can be created inside the optical material and varied in time such that a laser beam always propagates inside the lower-temperature region while the higher-temperature part of the optical material undergoes intense annealing. At a later point in time, the temperature distribution inside the optical material can be modified such that the temperature of the previously "hot" regions is lowered and the laser beam can be shifted to those regions while the temperature of the previously "cold" region is raised. Thus, a time-dependent temperature gradient can be created inside the optical material. This cycle can be repeated multiple times.

Note that this temperature adjustment can be performed in combination with the above-described optical excitation or separately. The above-described techniques can eliminate maintaining the optical material at high temperature, thereby avoiding the conventional inherent disadvantages of annealing. Therefore, these localized annealing techniques can provide increased applicability in cases where conventional material temperature adjustment is impossible (such as in case of non-critical phase matching) or impractical.

DETAILED DESCRIPTION OF THE DRAWINGS

During light absorption by an optical material, electrons are promoted from a valence band, which is a low energy state, to a conduction band, which is a high energy state. Electrons promoted to the conduction band may spontaneously lose energy and then return to the valence band in a process that releases energy in the form of light, i.e. fluorescence. Electrons that are too energetic (i.e. extend far into the conduction band) can cause significant damage to the material. That is, such electrons in the conduction band are "free" (i.e. non-bound) electrons that can move freely, accelerate, and release considerable amounts of energy (e.g. enough to break bonds of the crystal) before fluorescence takes place.

Figure 1:
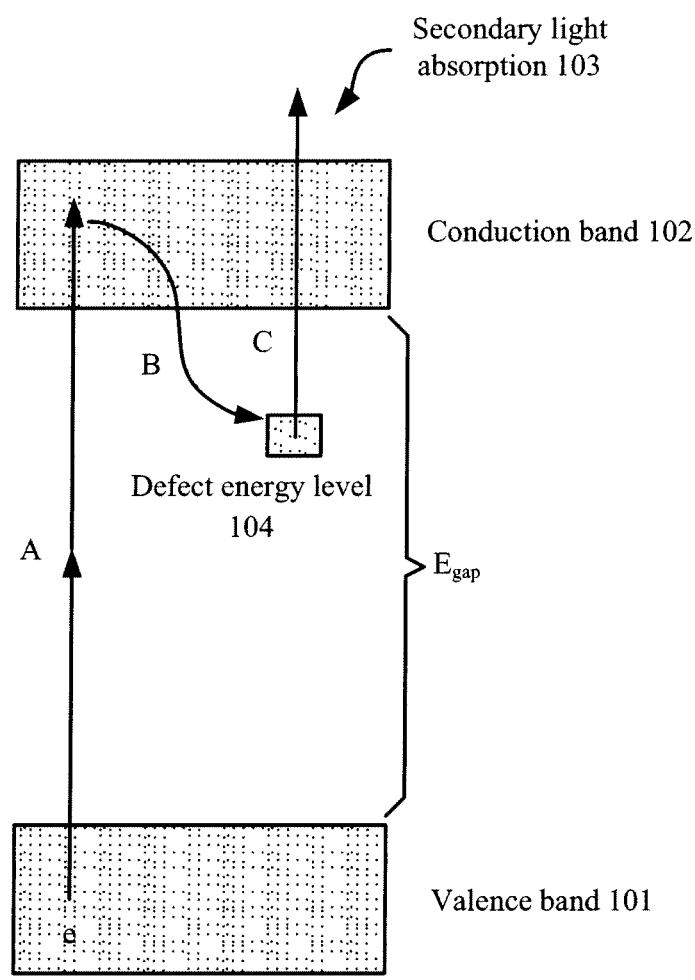
FIG. 1 shows one mechanism of transient color center formation.

FIG. 1 shows one mechanism of transient color center formation. In step A, an initial absorption promotes an electron e from a valence band 101 to a conduction band 102. In an ideal crystal, a band gap is spaced to have no intermediate energy levels between valence band 101 and conduction band 102. Therefore, in an ideal crystal, no electrons would end up inside the band gap. An actual crystal generally has one or more isolated energy levels present in the band gap, typically close to conduction band 102. FIG. 1 shows one such defect energy level 104 formed in the band gap.

In step B, an energy transfer (i.e. loss) results in a population of defect energy level 104 inside energy band gap $E_{gap}$. That is, one or more electrons, instead of returning to valence band 101, populate defect energy level 104. This population of defect energy level 104 is also called a transient color center because the electrons populating defect energy level 104 can begin to absorb wavelengths not previously absorbed, thereby resulting in a temporary change in absorption spectrum of the optical material.

For electrons populating defect energy level 104, some electrons may lose energy and return to valence band 101 and other electrons may gain energy via a secondary light absorption 103 and be promoted to conduction band 102 in step C. Unfortunately, any electrons deep in conduction band 102 (which can easily occur because of the energy associated with secondary light absorption 103) can result in increased damage to the optical material, as described above.

Figure 2:
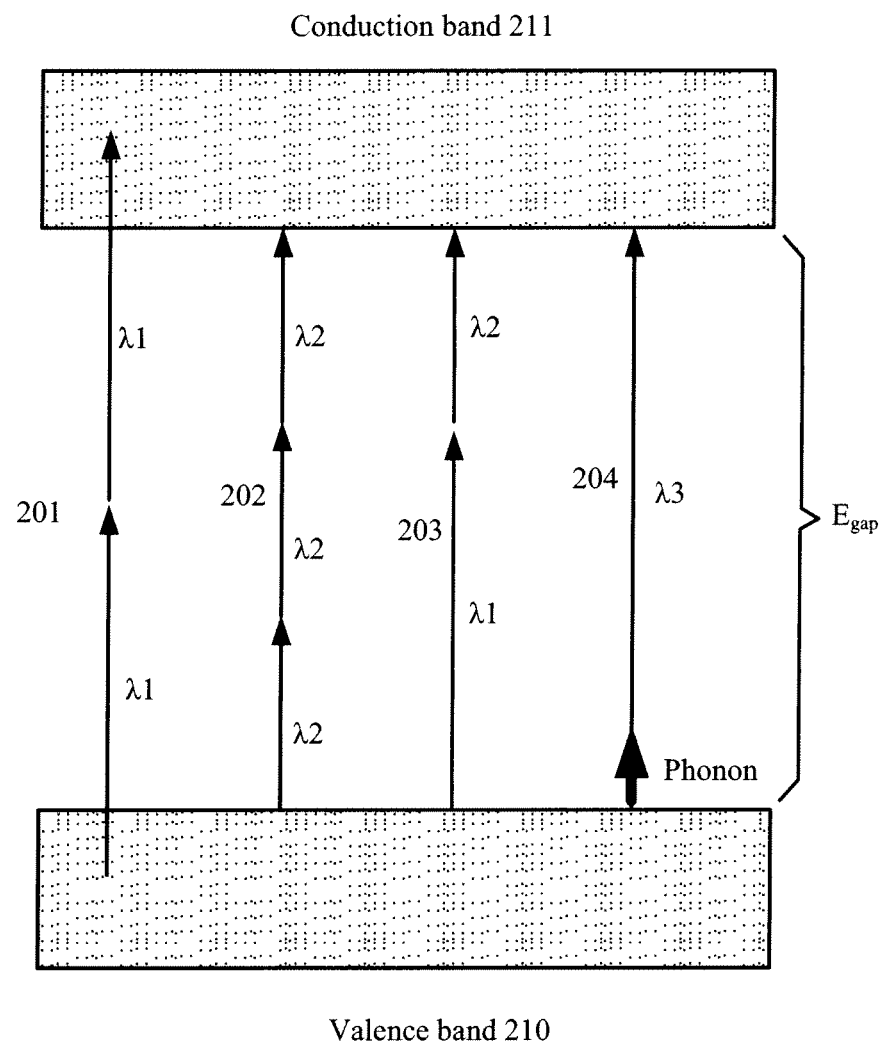
FIG. 2 illustrates examples of light absorption processes in which photon energy is smaller than the band gap $E_{gap}$ of the optical material, thereby prohibiting direct excitation from a valence band to a conduction band.

FIG. 2 illustrates examples of light absorption processes in which photon energy (as represented by the length of an arrow) is smaller than the band gap $E_{gap}$ of the optical material, thereby prohibiting direct excitation from a valence band 210 to a conduction band 211. In FIG. 2, $\lambda_3 < \lambda_1 < \lambda_2$ (i.e. the wavelength is inversely related to the length of the arrow). Notably, a photon having a wavelength $\lambda_3$ has more energy than a photon having a wavelengths $\lambda_2$ or $\lambda_1$.

In FIG. 2, process 201 is a single-color two-photon absorption, which is shown by two arrows. Each arrow represents a photon having a wavelength $\lambda_1$. Process 202 is single-color three-photon absorption, which is shown by three arrows. Each arrow represents a photon having a wavelength $\lambda_2$. Process 203 is multi-color two-photon absorption, which is shown by two arrows. A first arrow represents a photon having a wavelength $\lambda_1$, whereas a second arrow represents a photon having a wavelength $\lambda_2$.

Process 204 is phonon-assisted absorption in which a single photon having a wavelength $\lambda_3$ (which is close to but less than the band gap energy $E_{gap}$) is absorbed simultaneously with the phonon (a quantum of a material's internal vibration). Note that because phonons obey Bose-Einstein statistics, their population increases exponentially with temperature and so does the probability of phonon-assisted absorption.

Figure 3:
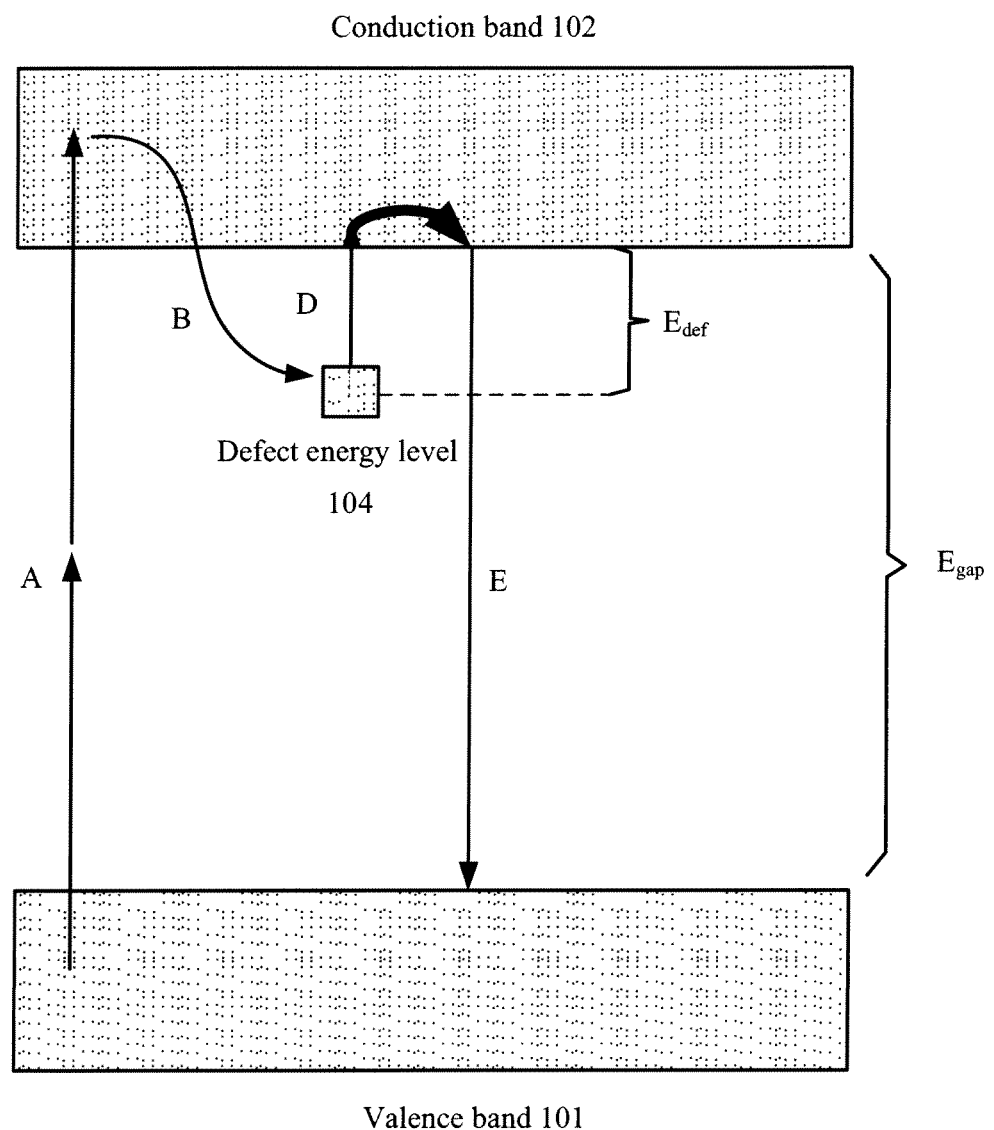
FIG. 3 shows a preferred mechanism of transient color center relaxation.

FIG. 3 shows a preferred mechanism of transient color center relaxation. Specifically, in step D, the promotion of electrons from defect energy level 104 into conduction band 102 can be accomplished with the least amount of energy absorption, i.e. just reaching into conduction band 102. Subsequently, in step E, electrons can quickly return to valence band 101 via emission of a photon (fluorescence) or another mechanism, while minimizing the possibility of damage to the material. Specifically, the amount of energy deposited into the optical material is minimized, thereby reducing laser-induced damage rate and increasing optical material lifetime.

The above-mentioned promotion of electrons from defect energy level into the conduction band can be achieved by using low energy optical and/or non-optical excitations (i.e. used separately or in combination). The optical excitation, i.e. bleaching, needs to be performed at a wavelength $\lambda_b$ that satisfies two conditions:

i. $\frac{hc}{\lambda_b} \geq E_{def}$ (1)

ii. $\lambda_b \gg \lambda_1$ (2)

where h is Planck's constant, c is the speed of light, $E_{def}$ is the minimum energy required to excite an electron from defect energy level 104 to conduction band 102 (see FIG. 3), and $\lambda_1$ is the laser wavelength that causes most of the optical material damage (typically the shortest wavelength). In one embodiment, to meet condition (2), at least a factor of 3 may be used. Note that for non-optical excitation in step D, phonons (described above) can be used. However, their population must be controlled such that phonon-assisted absorption of original laser light does not take place, which in many cases places restriction on the temperature of the optical material.

Figure 4:
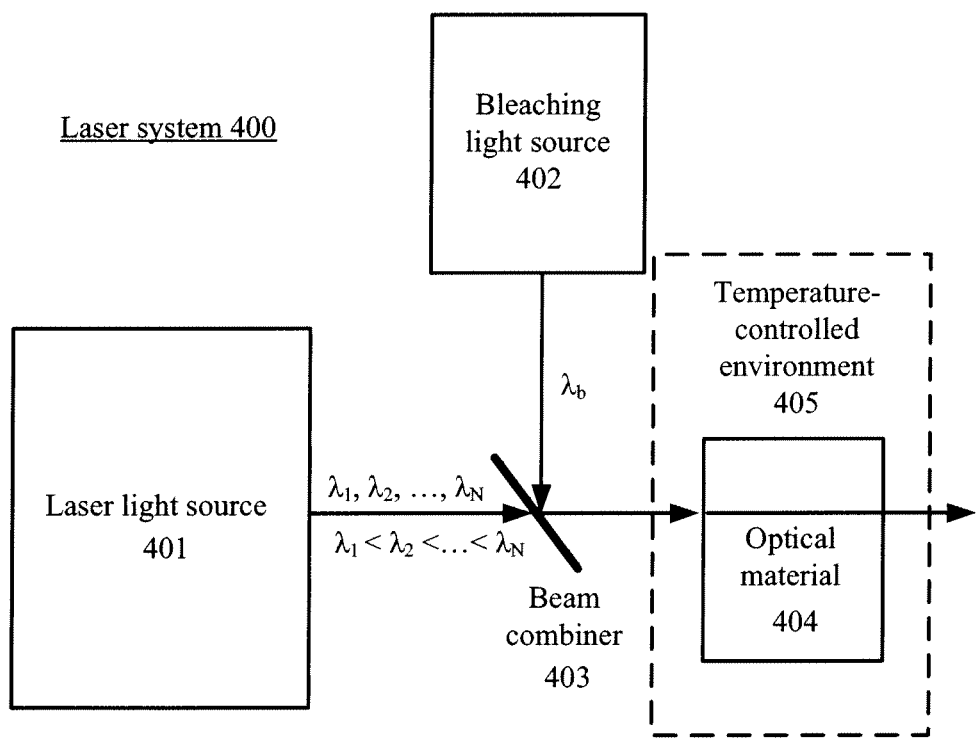
FIG. 4 illustrates an exemplary laser system including a laser light source, a bleaching light source, and a beam combiner.

FIG. 4 illustrates an exemplary laser system 400 including a laser light source 401, a bleaching light source 402, and a beam combiner 403. Bleaching light source 402 emits a light beam having a wavelength $\lambda_b$, which, when combined and co-propagated with a laser beam from laser light source 401 having one or more wavelengths $\lambda_1, \lambda_2, \ldots, \lambda_N$ using beam combiner 403, can maximize efficient depopulation of the defect energy levels associated with optical material 404. (Note that whether the laser beam includes one wavelength or multiple wavelengths $\lambda_1, \lambda_2, \ldots, \lambda_N$, conditions (1) and (2) must hold true with respect to wavelength $\lambda_b$.) In one embodiment, a temperature controlled environment 405 can be used to control phonon population inside optical material 404. Note that this optical bleaching and temperature control can be used separately or combined, depending on what is best suited for a particular laser system and its application.

Figure 5:
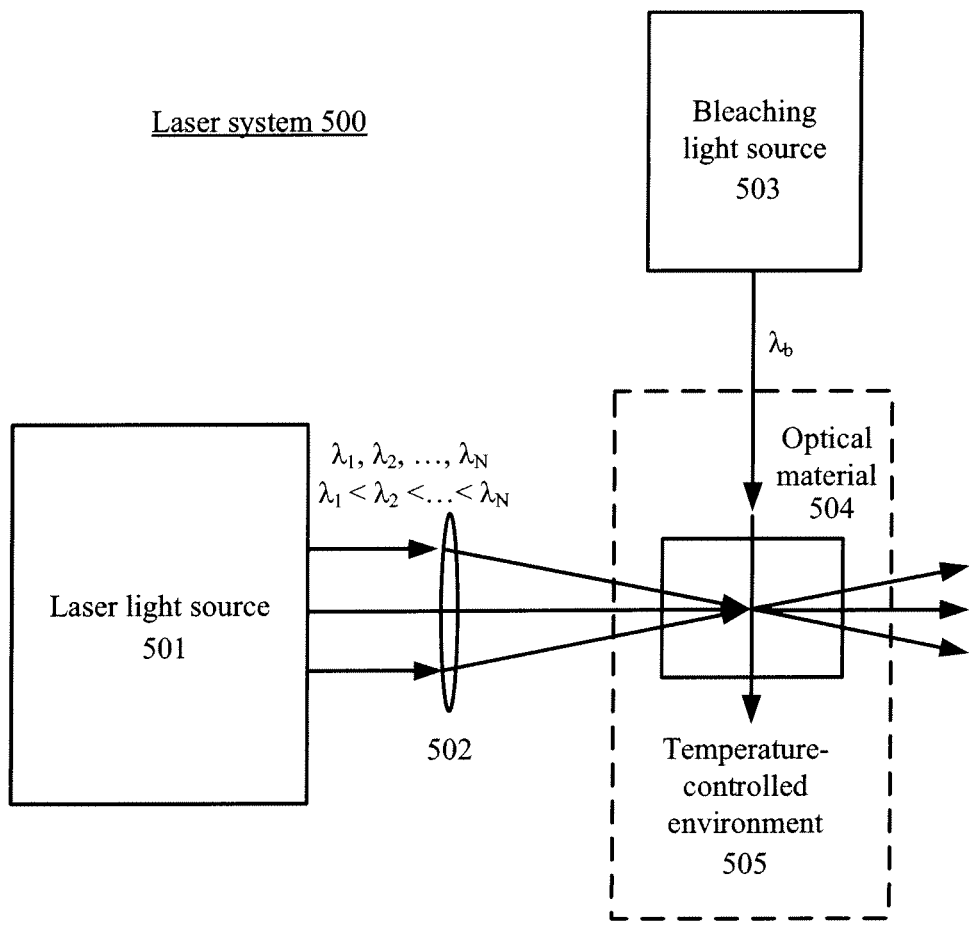
FIG. 5 illustrates an exemplary laser system including a laser light source, a focusing lens, and a bleaching light source.

FIG. 5 illustrates an exemplary laser system 500 including a laser light source 501, a focusing lens 502, and a bleaching light source 503. Bleaching light source 503 emits a radiation $\lambda_b$ that can be combined with the radiation $\lambda_1, \lambda_2, \ldots, \lambda_N$ emitted from laser light source 501 (and focused by lens 502) to maximize efficient depopulation of the defect energy levels associated with optical material 504. In this case, the co-propagation of the bleaching radiation is not necessary because only a small volume inside optical material 504 close to the focal plane is exposed to high laser fluence. Thus, this small region can be bleached locally by propagating the bleaching light at an angle (e.g. 90°, perpendicular to, or at some other intersecting angle) to the original laser beam, thereby providing a simple configuration for laser system 500. In one embodiment, a temperature controlled environment 505 can be used to control phonon population inside optical material 504. Once again, this optical bleaching and temperature control can be used separately or combined, depending on what is best suited for a particular laser system and its application.

Figure 6A:
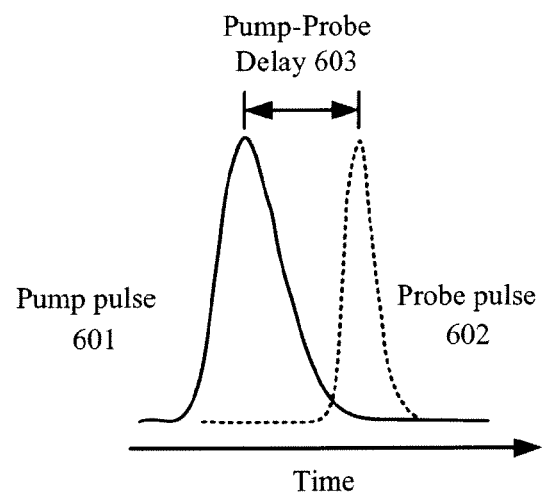
FIG. 6A illustrates an exemplary technique using a pump pulse associated with a pulsed laser beam and a probe pulse associated with a pulsed bleaching light source, wherein the two pulses are separated by a pump-probe delay.

If laser light sources 401 and 501 (FIGS. 4 and 5, respectively) are pulsed, then bleaching light sources 402 and 503 can also be pulsed and shifted in time with respect to those of the laser source. For example, FIG. 6A illustrates an exemplary technique using a pump pulse 601 associated with a pulsed laser beam and a probe pulse 602 associated with a pulsed bleaching light source, wherein pulses 601 and 602 are separated by a pump-probe delay 603. Advantageously, by minimizing the temporal overlap between the two light sources, cross-absorption (i.e. process 203 in FIG. 2) can be minimized. An electron at a defect energy level would preferably receive another photon at $\lambda_2$ (which would facilitate step D, FIG. 3) rather than another photon at $\lambda_1$ (which could result in step C, FIG. 1).

Exemplary bleaching of transient color centers with $\lambda_b$ satisfying conditions (1) and (2) can include an ArF (argon fluoride) excimer (193 nm) and frequency doubled Q-switched Nd:YAG (neodymium-doped yttrium aluminium garnet) (532 nm) lasers in a pump-probe configuration to observe absorption of 532 nm light induced by 193 nm light inside a Cesium Lithium Borate (CLBO) non-linear crystal (a non-linear optical material used to obtain DUV radiation by non-linear frequency conversion of solid-state and fiber laser infrared outputs).

Figure 6B:
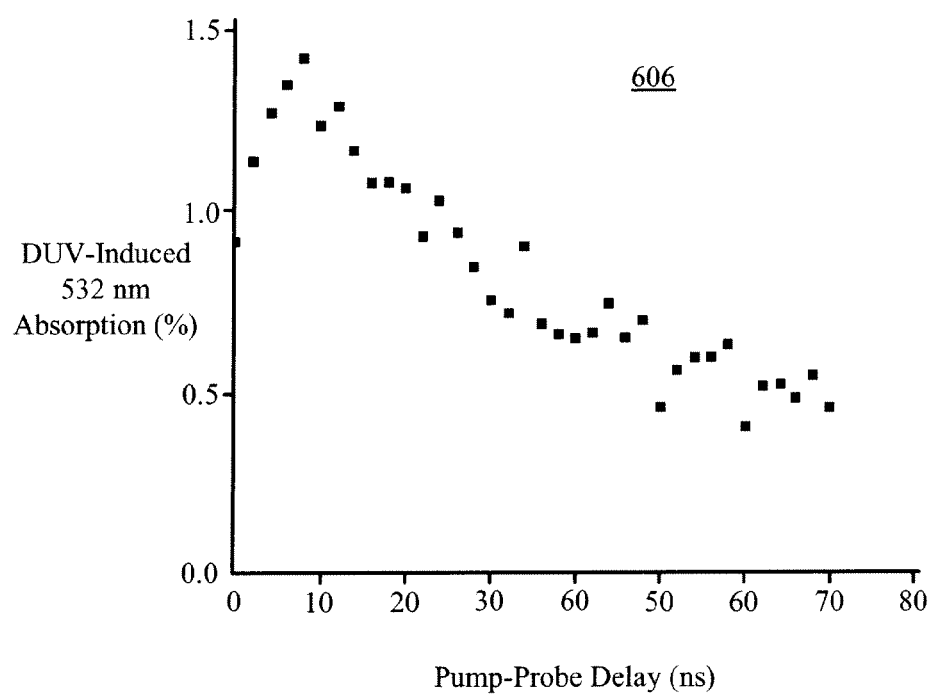
FIG. 6B illustrates experimental data of 532 nm absorption dependence on the delay between 193 nm and 532 nm pulses in CLBO crystal.

FIG. 6B illustrates experimental data 606 of 532 nm absorption dependence on the delay between 193 nm and 532 nm pulses. Note that data 606 supports evidence that the induced 532 nm absorption is caused by transient species, i.e. transient color centers, because the amount of absorption (which is proportional to color center concentration) decays as function of pump-probe delay. Data 606 further supports evidence that longer wavelength light (e.g. 532 nm or similar wavelengths) can be used to effectively bleach these transient color centers, thereby preventing secondary absorption of original light (e.g. 193 nm or similar wavelengths) that would deposit much larger amounts of energy into the optical material.

Notably, each optical material may have an optimized delay between laser and bleaching light pulses to ensure cross-absorption minimization as well as transient color center bleaching maximization.

Figure 7:
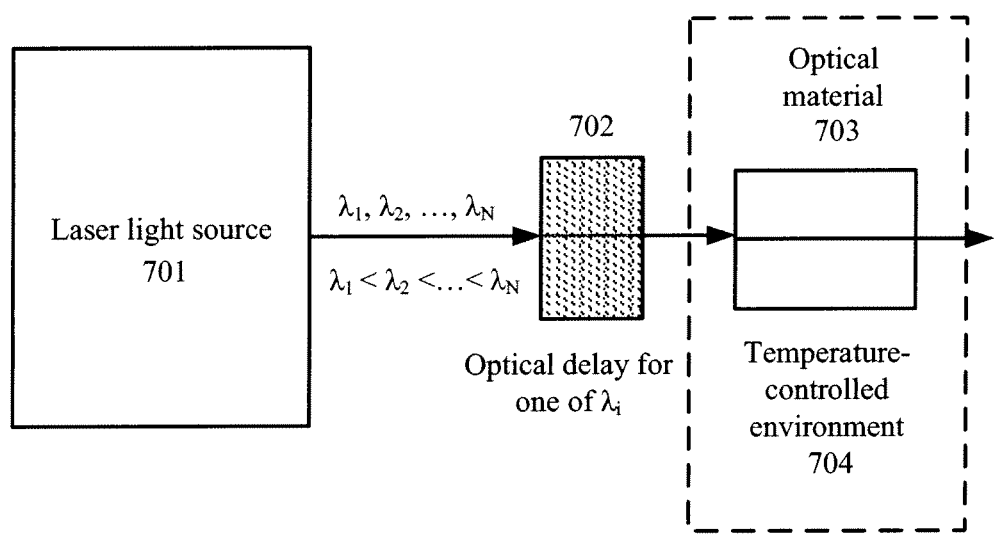
FIG. 7 illustrates a laser system in which an optical delay element can provide an optical delay for one wavelength of laser light source before the laser light (of multiple frequencies) passes through the optical material.

Note that when multiple wavelengths are present in the laser system, such as in the case of non-linear frequency conversion, it may be possible to use one of the wavelengths as a bleaching radiation as long as it satisfies conditions (1) and (2) discussed above. For frequency conversion process, for example, such wavelength could be a fundamental wavelength or one of the lower harmonics. As with the case of a separate bleaching light source, a temporal shift of the bleaching light is desirable and can be achieved by placing an optical delay element to delay light of a certain wavelength with respect to other wavelengths. For example, FIG. 7 illustrates a laser system 700 in which an optical delay element 702 can provide an optical delay for one wavelength of laser light source 701 before the laser light (of multiple frequencies) passes through optical material 703. In one embodiment, a temperature-controlled environment 704 can also be used to control phonon population inside optical material 703.

In one embodiment using a pulsed laser, the temperature of the optical material can be modulated such that it is low during the laser pulse and high between the pulses and/or when no laser pulses propagate through the optical material. The advantage of temperature modulation is more efficient thermal annealing of defects when no laser pulses are present without increase in light absorption due to high temperature.

Figures 8A, 8B:
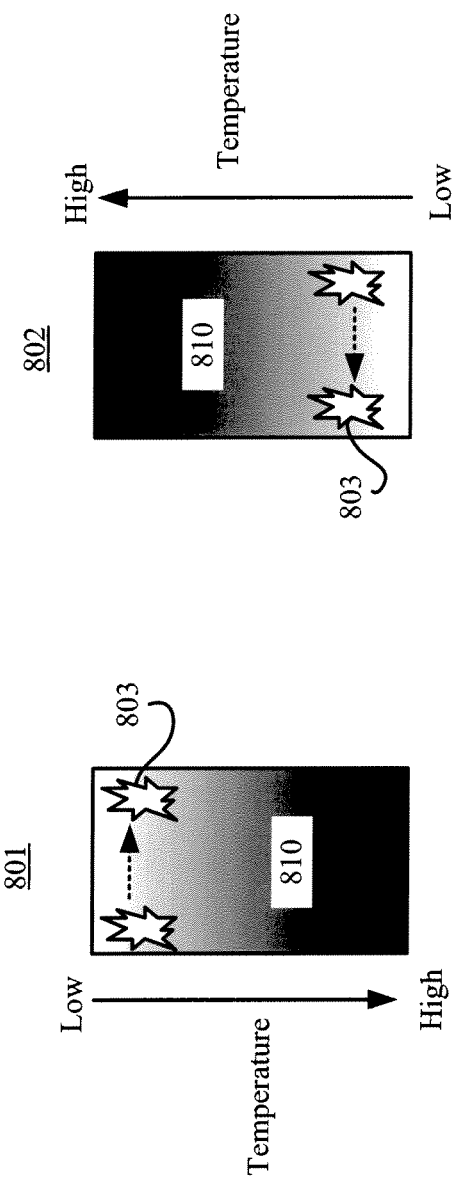
FIGS. 8A and 8B illustrate a technique of performing efficient thermal annealing by creating a temperature gradient inside the optical material and varying it in time such that a laser beam always propagates inside the lower-temperature region while the higher-temperature part of the optical material undergoes intense annealing.

FIGS. 8A and 8B illustrate a technique of performing efficient thermal annealing by creating a temperature gradient inside the optical material and varying it in time such that a laser beam always propagates inside the lower-temperature region while the higher-temperature part of the optical material undergoes intense annealing. For example, at time 801 (FIG. 8A), a laser beam can shift from left to right in a lower-temperature region of optical material 810 (shown in cross section) while a higher-temperature region undergoes thermal annealing (shown as the bottom region). At a later point in time, the temperature distribution inside optical material 810 can be modified such that the temperature of the previously "hot" regions is lowered and laser beam 803 can be shifted to those regions while the temperature of the previously "cold" region is raised. For example, at time 802 (FIG. 8B), a laser beam can shift from right to left in a different lower-temperature region of optical material 810 (shown as the top region). Thus, a time-dependent temperature gradient can be created inside optical material 810. The cycles shown in FIGS. 8A and 8B can be repeated multiple times.

To illustrate certain aspects of the present invention, an experimental study of the lifetime of Cesium Lithium Borate (CLBO) crystal was performed. The wavelength at which the study was performed is 193.3 nm. No bleaching radiation was used and only the temperature of the CLBO crystal was varied to find an optimum phonon population. The lifetime of the crystal was defined as the time it took for the transmission of 193.3 nm radiation through the CLBO crystal to decrease by 5%. Three CLBO samples grown at different times under different conditions were analyzed and the data was combined to obtain average lifetime as function of crystal temperature.

Figure 9:
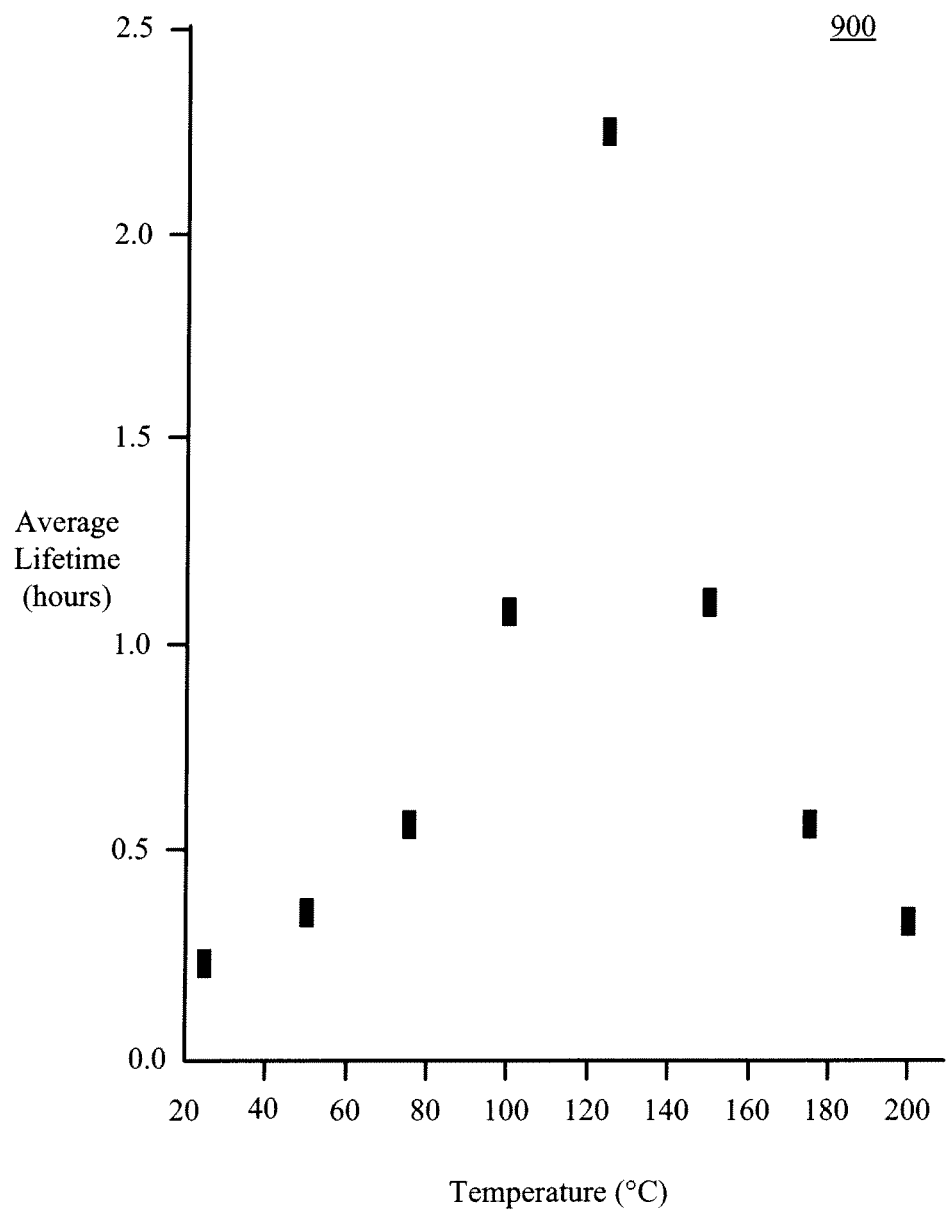
FIG. 9 illustrates results of temperature optimization to maximize lifetime of a non-linear CLBO crystal under exposure to 193.3 nm radiation.

FIG. 9 illustrates results of temperature optimization to maximize lifetime of a non-linear CLBO crystal under exposure to 193.3 nm radiation. As shown in FIG. 9, an optimum temperature of ~125° C. corresponds to the crystal's maximum lifetime. The lifetime falls sharply on both sides of the optimum temperature. For example, the lifetime at 150° C., which is the temperature at which CLBO crystals are typically used, was almost half of that at 125° C. The reason for this behavior, as explained above is increased transient color center formation via phonon-assisted absorption due to excessive phonon population at high temperatures, while inadequate annealing due to insufficient number of phonons decreases lifetime at low temperatures.

Although illustrative embodiments of the invention have been described in detail herein with reference to the accompanying figures, the embodiments described herein are not intended to be exhaustive or to limit the invention to the precise forms disclosed. As such, many modifications and variations will be apparent. For example, in one embodiment, the optical material can be integrally formed as part of the laser light source. Note that although a CLBO crystal is described herein, other optical materials that can benefit from suppression of transient color center formation may include BBO (beta-barium borate), CBO (cesium triborate), LBO (lithium triborate), KDP (potassium dihydrogen phosphate), KD*P, ADP (ammonium dihydrogen phosphate), KTP (potassium titanyl phosphate), or periodically polled material. Accordingly, it is intended that the scope of the invention be defined by the following Claims and their equivalents.

The invention claimed is:

1. A method for increasing a lifetime of an optical material exposed to a laser light source, the laser light source generating a laser beam having at least one wavelength $\lambda_1$, the method comprising:
   providing a bleaching light source that generates a bleaching light beam having a wavelength $\lambda_b$, wherein $\lambda_b \geq 3\lambda_1$;
   combining the bleaching light beam with the laser beam to generate a combined beam;
   using the combined beam for operation of a laser system including the optical material;
   determining an average lifetime as a function of temperature of the optical material to yield an optimized temperature that results in a maximum lifetime; and
   using the optical material within a temperature range such that the lifetime is within at least one-half of the maximum lifetime.

2. A method for increasing a lifetime of an optical material exposed to a laser light source, the laser light source generating a laser beam having at least one wavelength $\lambda_1$, the method comprising:
   providing a bleaching light source that generates a bleaching light beam having a wavelength $\lambda_b$, wherein $\lambda_b \geq 3\lambda_1$;
   combining the bleaching light beam with the laser beam to generate a combined beam;
   using the combined beam for operation of a laser system including the optical material; and
   wherein the laser light source is pulsed, and
   wherein a temperature of the optical material is kept low while laser pulses are present in the optical material, and the temperature of the optical material is kept high when no laser pulses are present in the optical material.

3. A method for increasing a lifetime of an optical material exposed to a laser light source, the laser light source generating a laser beam having at least one wavelength, the method comprising:
   using a bleaching light beam to depopulate a defect energy level inside a band gap of the optical material, the bleaching light beam having at least a 3× wavelength than any wavelength of the laser beam;
   determining an average lifetime as a function of temperature of the optical material to yield an optimized temperature that results in a maximum lifetime; and
   using the optical material within a temperature range such that the lifetime is within at least one-half of the maximum lifetime.

4. The method of claim 3, wherein adjusting the temperature of the optical material balances increased transient color center formation and inadequate annealing.

5. A method for increasing a lifetime of an optical material exposed to a laser light source, the laser light source generating a laser beam having at least one wavelength, the method comprising:
   using a bleaching light beam to depopulate a defect energy level inside a band gap of the optical material, the bleaching light beam having at least a 3× wavelength than any wavelength of the laser beam,
   wherein the laser light source is pulsed, and
   wherein a temperature of the optical material is kept low while laser pulses are present in the optical material, and the temperature of the optical material is kept high when no laser pulses are present in the optical material.

6. The method of claim 3, wherein the bleaching light beam propagates parallel to the laser beam.

7. A method for increasing a lifetime of an optical material exposed to a laser light source, the laser light source generating a laser beam having at least one wavelength, the method comprising:
   using a bleaching light beam to depopulate a defect energy level inside a band gap of the optical material, the bleaching light beam having at least a 3× wavelength than any wavelength of the laser beam,
   wherein the laser beam and the bleaching light beam are pulsed, and
   wherein the pulsed bleaching light beam is time shifted with respect to the pulsed laser beam to minimize cross-absorption and maximize transient color center bleaching.

8. A method for increasing a lifetime of an optical material exposed to a laser light source, the method comprising:
   creating a time-dependent temperature gradient inside the optical material such that a cross-section of the optical material includes a first region of low temperature and a second region of high temperature, the first and second regions changing locations over time; and directing a laser beam generated by the laser light source to the first region of low temperature in the optical material, wherein the laser beam is shifted through the first region, but not the second region.

9. A laser system comprising:

a laser light source for generating a laser beam having at least one wavelength $\lambda_1$;

a bleaching light source for generating a bleaching light beam having a wavelength $\lambda_b$, wherein $\lambda_b \geq 3\lambda_1$;

a beam combiner for combining the bleaching light beam with the laser beam to generate a combined beam; and a temperature-controlled environment for optical material of the laser system, the temperature-controlled environment for using the optical material within a temperature range such that a lifetime of the optical material is within at least one-half of a maximum lifetime, the maximum lifetime being determined by reference to an average lifetime as a function of temperature of the optical material, which yields an optimized temperature that results in the maximum lifetime.

10. The laser system of claim 9, wherein the temperature-controlled environment includes a temperature adjustment component for providing localized annealing.

* * * * *